C. H. MELVIN.
PLOW.
APPLICATION FILED JULY 9, 1909.

1,112,150.

Patented Sept. 29, 1914.
5 SHEETS—SHEET 2.

Witnesses
B. G. Brann
R. S. Gehr

Inventor
C. H. Melvin
By H. H. Bliss
Attorney

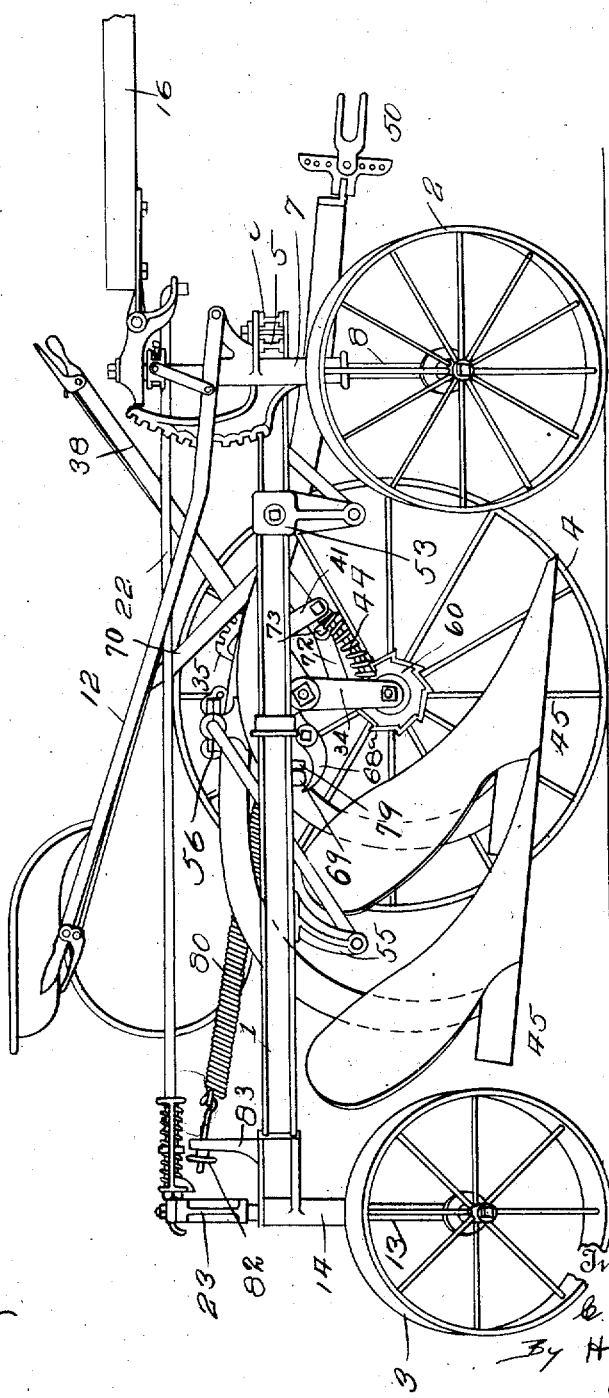

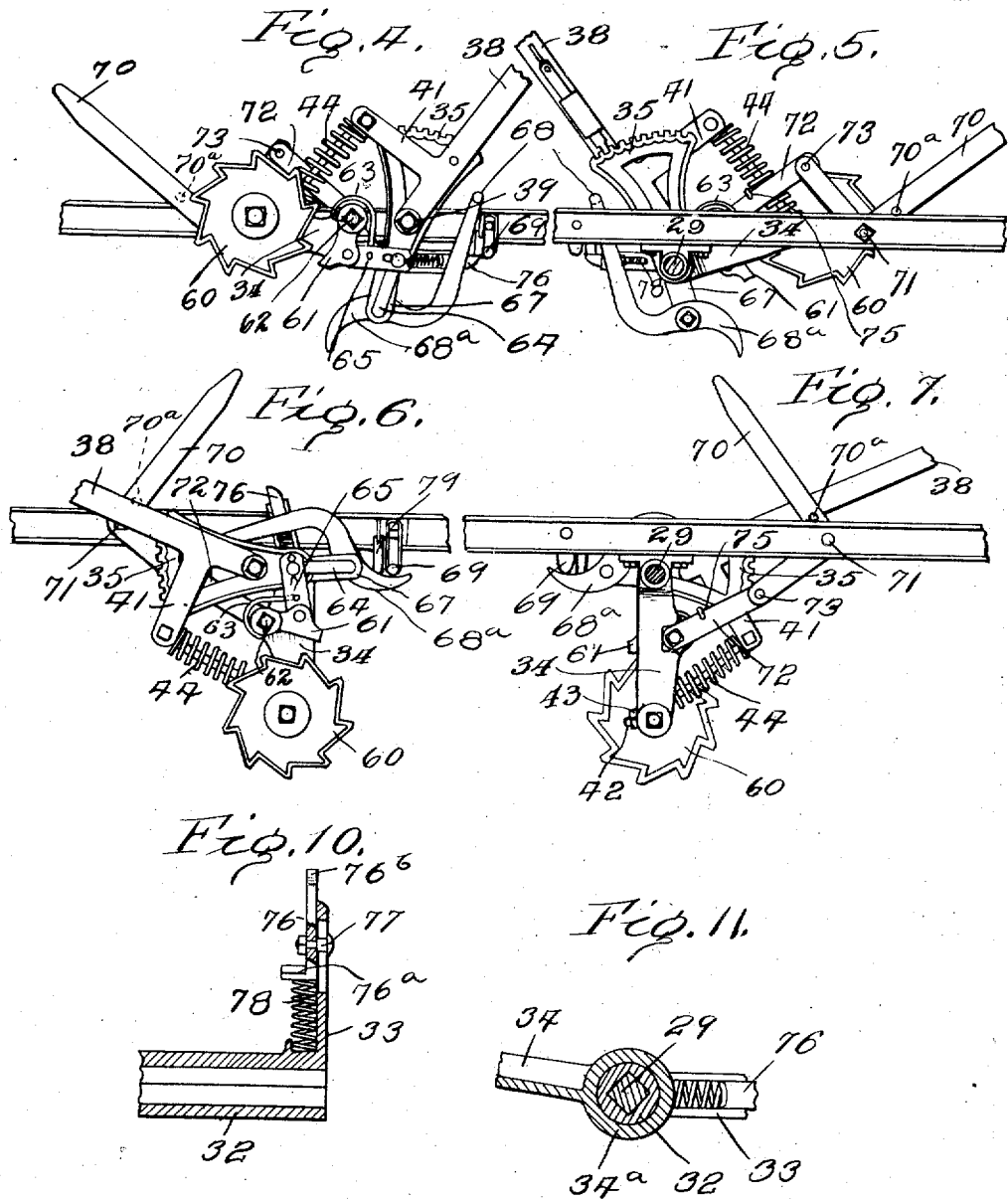

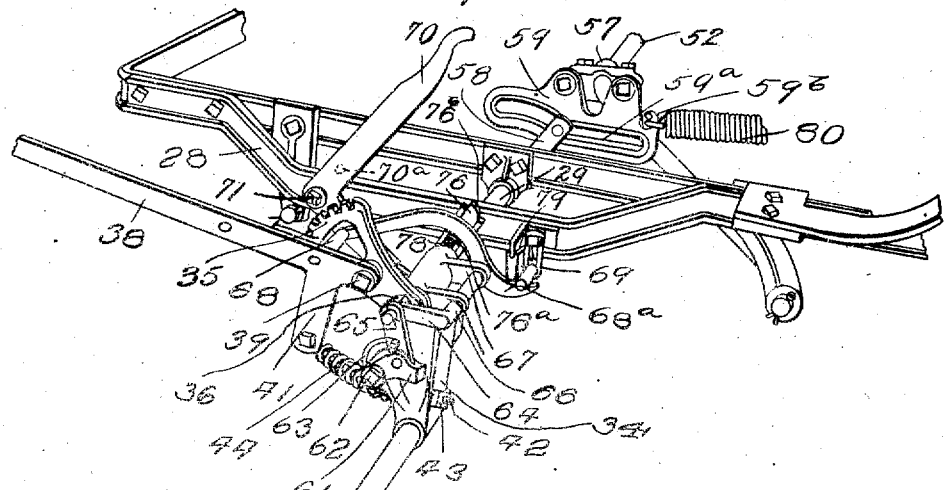
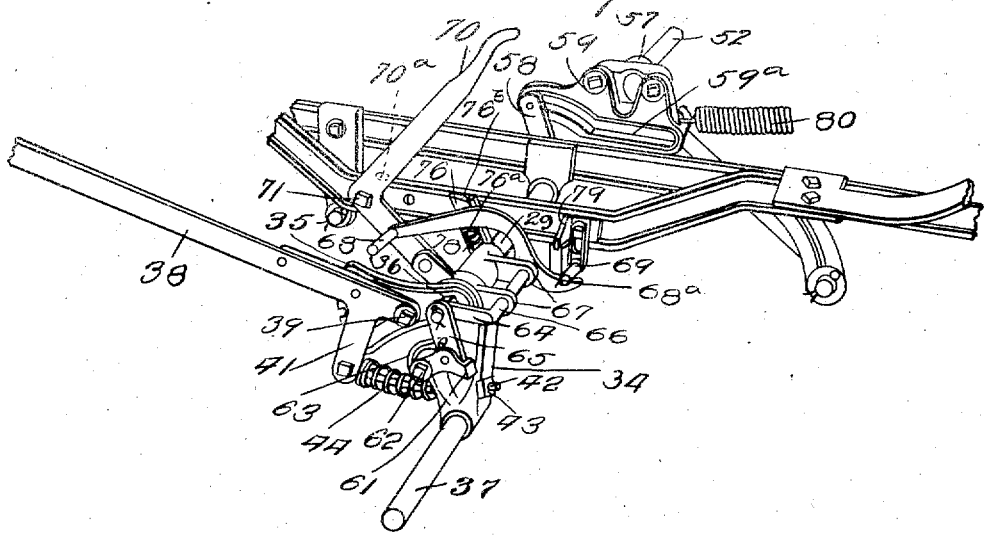

UNITED STATES PATENT OFFICE.

CHARLES H. MELVIN, OF MOLINE, ILLINOIS, ASSIGNOR TO DEERE & COMPANY, A CORPORATION OF ILLINOIS.

PLOW.

1,112,150.  Specification of Letters Patent.  Patented Sept. 29, 1914.

Application filed July 9, 1909. Serial No. 506,716.

*To all whom it may concern:*

Be it known that I, CHARLES H. MELVIN, citizen of the United States, residing at Moline, in the county of Rock Island and State of Illinois, have invented certain new and useful Improvements in Plows, of which the following is a specification, reference being had therein to the accompanying drawing.

My invention relates to riding plows, and more especially to riding plows of the three wheeled type, that is a plow having two furrow wheels and one land wheel. In my earlier application, filed July 29, 1908, Ser. No. 445,978, I have shown a plow of the type referred to, which is so constructed that the plows can be raised by the draft of the team at the will of the operator. This earlier plow is also provided with means for automatically locking the plows in their lifted inoperative position, and is provided with means for adjusting the plows to work at various depths.

The object of the present invention is to provide a construction simpler and less expensive than that shown in my earlier application, which shall not only be capable of performing all of the operations of the earlier construction but shall in addition comprise means for automatically locking the plows down at various depths.

A further object of the present invention is to provide an automatically controlled power actuated lifting mechanism which is adapted to lift the plows to the same inoperative position from any working depth at which they may be adjusted.

The various improvements which I have effected will be clearly understood from the following description in connection with the accompanying drawings.

Figure 1:
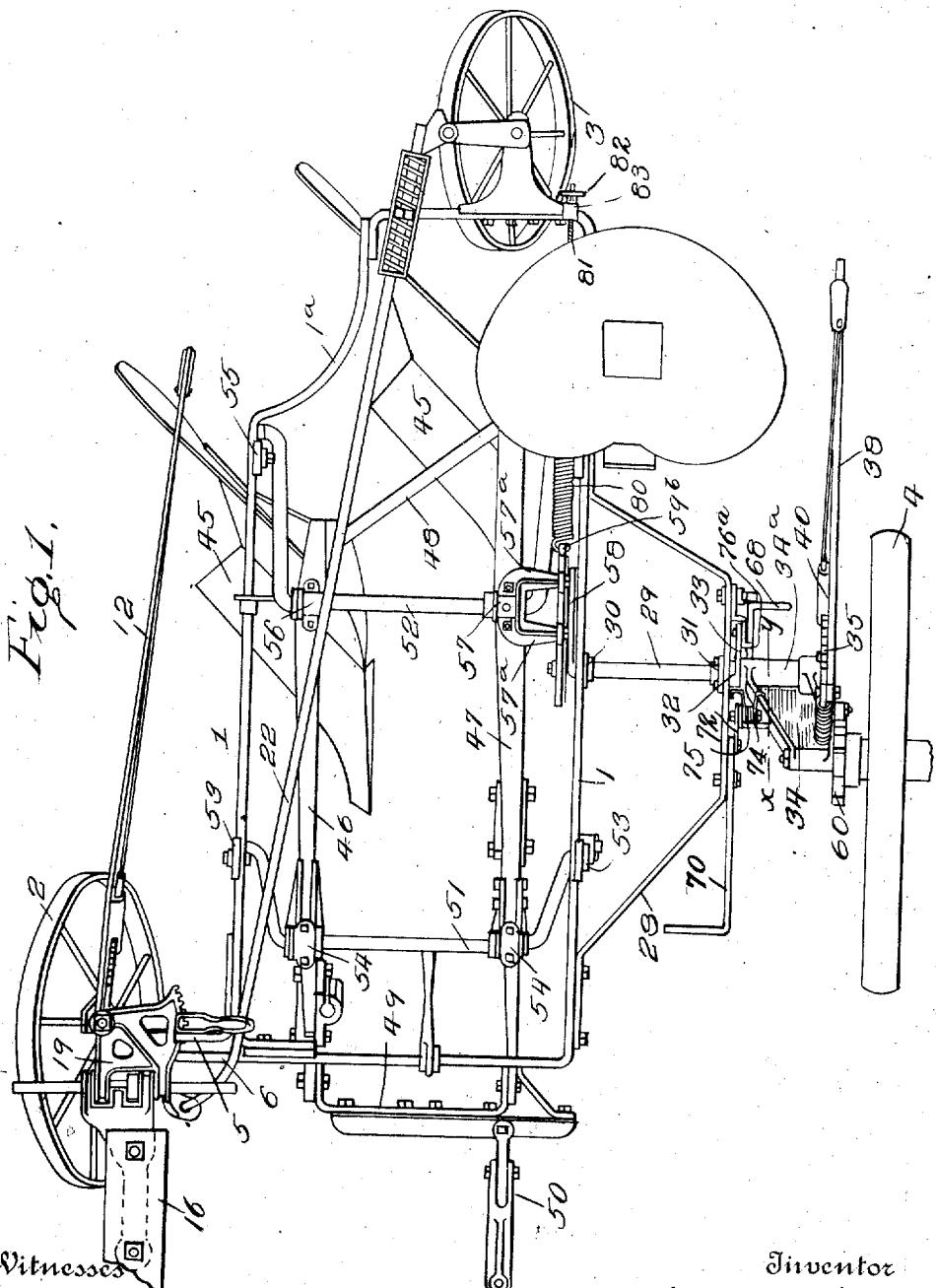
Figure 2:
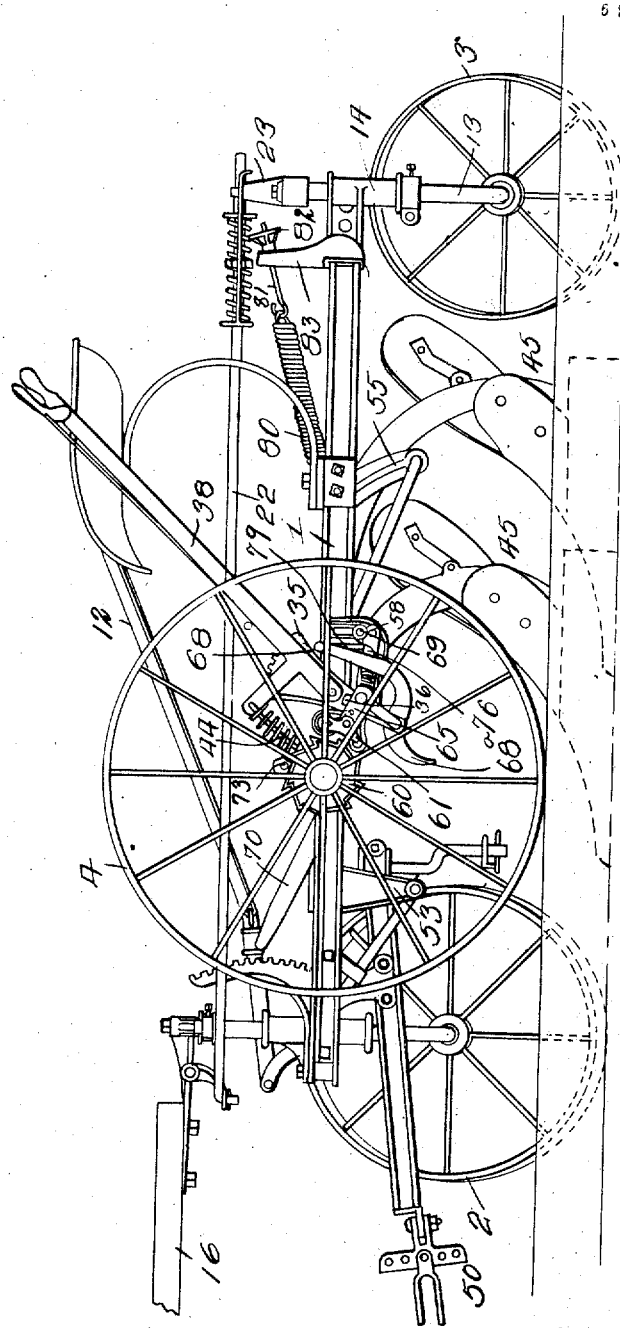

Figure 1 is a plan view of a plow embodying my invention. Fig. 2 is a left side elevation of this plow. Fig. 3 is a right side elevation. Figs. 4 and 5 are left and right side elevations respectively of the plow lifting mechanism, showing the parts in the positions occupied when the plows are fully lowered. Figs. 6 and 7 are similar views showing the parts in the position they occupy when the plows are raised. Fig. 8 is a perspective view of the plow lifting mechanism, showing the parts in the positions occupied when the plows are raised and with the parts adjusted for shallow plowing. Fig. 9 is a view similar to Fig. 8 with the parts adjusted for deep plowing. Fig. 10 is a vertical section taken on the line $x$—$y$ in Fig. 1. Fig. 11 is a perspective view of a part of the mechanism for locking the plows down.

Referring now to the construction in detail, 1 is the main frame which is preferably formed of steel bar stock and is rectangular in general outline except for the inwardly curved part at 1ª. This frame is supported upon the furrow wheels 2 and 3 and a land wheel 4. The right forward corner of the frame 1 is provided with laterally extending bars 5 and 6 upon which is mounted a sleeved bracket 7 in which is rotatably mounted the upright spindle part of the axle 8 upon which the furrow wheel 2 is mounted. Manual means comprising a hand lever 12 are provided for adjusting the frame up and down on the spindle 8, but these devices need not be described in detail as they do not in themselves constitute a part of the invention covered in the present application. The rear furrow wheel is mounted upon a spindle 13 which is suitably mounted in a bearing 14 carried by the main frame. To the upper end of the spindle 8 is adjustably secured a plate 19 and to this plate is secured a steering tongue or pole 16 and also the end of a steering rod 22 which extends rearward and is connected to a crank arm 23 on the upper end of spindle 13. These steering connections, as to matters of detail, may be of any improved construction.

To provide a mounting for the land wheel 4, a frame extension 28 is secured to the side of the main frame and a shaft 29 is rotatably mounted in brackets 30 and 31 secured to the main frame and the outer side of the extension 28 respectively. The outer end of the shaft 29 which extends beyond the bearing bracket 31 is made square in cross section, and to this squared part of the shaft is fitted a sleeve 32. This sleeve carries at its inner end a radially extending arm 33 on which is slidably mounted a locking bolt which will later be described.

34 is a radius arm having a web-like body with flanges at its inner and outer side, and a sleeve part 34ª which is rotatably mounted upon the sleeve 32.

35 is a toothed segment rigidly mounted on the outer end of sleeve 32, and the several parts thus assembled, namely, the sleeve 32, radius arm 34 and segment 35 are retained in position on the outer end of shaft 29 by nut 36. An axle 37 is mounted in the outer end of radius arm 34, and on this axle the land wheel 4 is mounted.

The radius arm 34, as stated above, is loosely sleeved on the sleeve 32, but it is adjustably and yieldably held against turning upon said sleeve, the latter, as stated above, being fixed on shaft 29. The toothed segment 35 being rigidly secured to the sleeve 32, is also fixed to shaft 29.

38 is a hand lever pivotally mounted at 39 on the segment 35 and said hand lever is provided with a thumb latch device 40 which engages the teeth of the segment to hold the latter and the hand lever in any desired relation within the limits of the segment. The hand lever carries a crank arm 41, to the end of which is pivotally secured one end of a rod 42, the other end of said rod extending loosely through a hole in the outer end of radius arm 34. A nut 43 is mounted on the end of the rod 42 and serves to prevent the withdrawal of the rod from the aperture of the arm 34. A heavy coiled spring 44 is mounted on the rod 42 between the end of the lever arm 41 and the radius arm 34.

The land wheel mounting, constructed as described, is such that the axle of the wheel may swing downward and backward, and I employ this movement for the twofold purpose of effecting the lifting of the plow and the leveling of the frame. It is clear that the radius arm 34 and with it the land wheel 4 may be swung downward and backward by simply throwing the hand lever forward, but I prefer to effect this movement by means of the draft of the team.

The plow bodies 45, of which two are shown in the construction illustrated, are carried by the beams 46, 47, which are rigidly secured together by cross bars 48 and 49, so as to form a rigid frame by which the plow bodies are supported. To the front cross bar 49 draft devices 50 are attached. The plows are connected to the wheeled frame 1 by means of front and rear cranks or bails 51 and 52. The latter is preferably longer than the former so as to give the rear ends of the plow beams a greater range of movement than their front ends when the plows are raised and lowered. The ends of the front bail 51 are pivotally mounted in brackets 53 which depend from the main frame 1, and each of the plow beams carries an upstanding bracket 54 having a bearing box which embraces the transverse part of the bail. The bail 52 has its ends similarly mounted in brackets 55, which depend from the frame 1, and the two plow beams are provided with bearing brackets 56, 57 which embrace the transverse part of the bail. When the plows are elevated, it is clear that their movement in relation to the wheel frame 1 will be determined by the bails 51 and 52.

To effect the elevation of the plows through the rocking of the shaft 29, the inner end of the latter is provided with a crank 58, the outer end of which engages the slot 59ª of plate 59 which is rigidly bolted to the arms 57ª carried by bearing bracket 57. It will be noted (see Figs. 8 and 9) that the rear part of the slot 59ª is straight, whereas the front part is in the form of an arc of a circle described by a radius equal in length to the length of the crank 58. With such a connection between the shaft 29 and the plow beams, it is clear that when the radius arm 34 swings downward and rearward, the plows will be lifted and when it swings forward and upward the plows will be lowered. To effect this movement through the draft of the team the following construction is provided: 60 is a ratchet wheel, preferably formed integral with the hub of the land wheel 4. 61 is a pawl pivotally mounted at 62 on the radius arm 34 and adapted to be swung into the path of the teeth of ratchet wheel 60 so as to lock said wheel and with it the land wheel 4 against forward rotation relative to the radius arm. The pawl 61 is normally held out of engagement with ratchet wheel 60 by a spring 63 and is moved into engagement with said wheel by means of a crank 64, which is connected to the pawl by means of a link 65. The crank 64 is carried by a shaft 66 which is rotatably mounted in arms or brackets 67, 67 carried by and preferably integral with the radius arm 34 (see Figs. 8 and 9). A foot-lever 68 is rigidly mounted on the inner end of the shaft 66, and said lever is provided with an extension 68ª adapted when the radius arm swings downward and rearward to move into engagement with a stop 69 which is adjustably mounted on the frame extension 28. If when the plows are lowered and the parts are in the positions shown in Figs. 4 and 5, the foot-lever 68 is moved forward, the effect is to throw the pawl 61 into engagement with the ratchet wheel 60, thus locking the land wheel to the radius arm so that both are caused to swing backward and downward relative to the wheel frame under the draft of the team. This backward swinging of the radius arm rocks the shaft 29 and causes the crank 58 in connection with the slotted plate 59 to lift the plows from the ground. As the radius arm swings backward and approaches a vertical position, as shown in Figs. 6 and 7 and also Figs. 8 and 9, the extension 68ª of the foot-lever comes into engagement with the stop 69 when a slight continued movement of the radius arm causes the shaft 66 to be rocked so as to withdraw the pawl 61 from engagement with the ratchet wheel 60, thus freeing the land wheel again for rotation on its axis.

In order to retain the plows in elevated position when elevated in the manner above described, I provide a toggle lever locking device, which comes into action automatically to lock the parts in the positions shown in Figs. 6, 7 and 8 and which may be released by a mere touch of the operator's foot. This toggle lever mechanism comprises a foot lever 70 which is pivotally mounted at 71 on the frame extension 28 and a link 72 which is connected at one end to an extension of the foot lever 70 by means of a pivot bolt 73 and at its other end is connected to a bracket 74, which is rigidly bolted to the inner side of the radius arm 34. A spring 75 carried by the bracket 70 has one end engaging the radius arm 34 and its other end arranged in position to engage the link 72 when the parts move to the positions taken when the plows are raised. The action of the spring 75 as thus mounted is to throw the joint formed by the pivot bolt 73 downward, such downward movement being arrested just after the bolt 73 passes the line of centers by means of a stop lug 70ª carried by the foot lever 70 in position to engage the upper edge of the frame extension 28, as indicated in Fig. 7.

With this construction it is clear that the weight of the plows acting through the crank 58 and shaft 29, tends to swing the radius arm 34 forward, but this movement is prevented by the toggle mechanism, the toggle joint at 73 being held in its locking position just past the dead center by the spring 75 and by the weight of the plows. At the same time the operator can easily overcome the action of the spring and weight by pressing the foot lever 70 forward, thus moving the toggle joint 73 upward past the line of centers, so as to start the lowering movement of the plows which is then continued automatically, the weight of the plows and connected parts being effective to carry the plows down into operative engagement with the ground.

When the plows are lowered, the depth to which they enter the ground is determined by the adjustment of the hand-lever 38. In Figs. 1 and 2, and also Figs. 4, 5, 6, 7 and 9, this lever is adjusted backward as far as possible in relation to the toothed segment 35. If the hand lever were adjusted forward from the position shown in Fig. 2, the radius arm 34 would, by reason of the increased tension of the spring 44, be caused to swing downward. During this movement the shaft 29 would not be moved and the plows therefore would not move in relation to the main frame 1. But since the frame 1 would itself be bodily lifted by the downward swing of the land wheel, the plows would also be lifted, and thus an adjustment for more shallow plowing would be effected. It will be understood that the spring 44, while strong enough to effect the adjustment referred to, will permit the land wheel to have a limited upward movement relative to the main frame when any sudden obstruction, such as a rock, is encountered by said wheel, such obstruction being passed, therefore, without materially affecting the depth of the plows.

In doing some kinds of plowing it is desirable to be able to lock the plows down so that when once lowered they will be held to their work. In my present invention I provide means whereby the plows may be automatically locked down at any depth to which they may have been adjusted by means of the hand lever 38.

I have previously referred to the radial arm 33, which is carried by the sleeve 32, and which therefore turns with the shaft 29.

76 is a bolt slidably mounted on the grooved outer face of the arm 33, the arm 33 being slotted to receive a lug 77 carried by the bolt 76 and limit the sliding movement of the latter in relation to the arm. The lug 77 is threaded to receive a nut which retains the bolt on the arm 33. The bolt is pressed outward by a coiled spring 78, which engages its inner end. On the inner end of the bolt 76 is formed an outward extending lug 76ª, which is designed to be engaged by the foot lever 68, as indicated in Figs. 4, 8 and 9.

79 is a bracket mounted on the frame extension 28 in position to be engaged by the bolt 76 when the radius arm swings forward with the lowering of the plows. The outer end of the bolt 76 is beveled at 76ᵇ so that when it engages the bracket 79 it is forced inward against the tension of spring 78 and then springs outward into locked engagement with said bracket 79. With the parts thus locked, it will be seen that the plows are prevented from rising from their operative positions. At the same time when it is desired to lift the plows, it is only necessary for the operator to press forward the foot lever 68, the movement of which serves not only to move the pawl 61 into engagement with ratchet wheel 60 but also forces the locking bolt 76 inward by reason of the engagement of the foot-lever 68 with the lug 76ª of the bolt. Now, it is to be observed that while the plows may be adjusted to different working depths by means of the hand lever 38, this adjustment is effected by swinging the radius arm 34 in relation to the shaft 29. In other words, when the plows are lowered, the shaft 29 always swings to the same point irrespective of the adjustment of the hand lever 38. Therefore in all depth adjustments, the locking bolt 76 moves to the same operative position when the plows are lowered, and thus the automatic locking down of the plows is effected in all cases.

While the shaft 29, as stated, always moves to the same position when the plows are lowered, the extent of the movement of said shaft during the lifting of the plows will vary with the depth adjustment. This is due to the fact that in lifting the plows the radius arm always swings to a substantially vertical position before the extension 68ª of the foot lever engages the stop 69 to withdraw the pawl 61 from the ratchet wheel. And inasmuch as the radius arm will have a greater or less swing before coming to said vertical position, according as it is adjusted to its highest point, as shown in Fig. 4, to give the plows the maximum depth of penetration, or to a lower position to give a less depth of penetration, the effect would naturally be to lift the plows to different inoperative positions; but, as this is not desirable, I have made the plate 59 with the peculiarly formed slot 59ª, as previously described.

Referring to Figs. 8 and 9, it will be noted that in the former the hand lever 38 is adjusted so as to give a minimum depth of penetration by the plows. The swing of the radius arm 34 to effect the lifting of the plows is correspondingly short, and it will be noted that the pin of the crank 58 has moved forward just to the end of the straight part of the slot 59ª. In Fig. 9, on the other hand, the hand lever 38 is adjusted backward to give the maximum depth of penetration by the bottoms. The swing of the radius arm in lifting the plow will here be correspondingly great, namely about 90°, as will be seen by a comparison with Fig. 4; and it will be observed that the crank 58 has moved forward throughout the length of the curved part of the slot 59ª. However, the increased movement of the crank 58, as compared with its movement in the case illustrated by Fig. 8, does not effect a greater elevation than in said case because the curved part of the slot corresponds to a radius equal in length to the length of the crank 58. Therefore, the plows are in every case raised to the same inoperative position.

A heavy coil spring 80 is connected at its forward end to the slotted plate 59 and at its rear end is provided with a threaded rod 81 and a hand nut 82 by which it is adjustably connected to a bracket 83 on the wheel frame. The action of this spring is to assist in the lifting of the plows.

The operation and manner of handling the plow will be readily understood from the following description: On entering the field with the plows in their elevated position, as shown in Fig. 3, the operator having determined the depth of cut by adjusting the hand lever 38, and also, perhaps, the hand lever 12, the plows are lowered by the operator pressing forward on the foot lever 70, thus releasing the toggle lock and allowing the plows to descend under the action of gravity and the land wheel to swing forward. As the plows move forward they take into the ground point first by reason of the difference in length of the bails 51 and 52, finally taking the position shown in Fig. 2, in case the hand levers had been set for deep plowing. As the plows are moving downward to this position the shaft 29 turns, causing the arm 33 and with it the locking bolt 76 to swing backward and downward until the bolt springs out into the locking position beneath the bracket 79.

As the machine moves forward the plows are held down to their work by the bolt 76. At the same time there is a certain flexibility in the action of the machine, because the land wheel is capable of rising more or less against the tension of the spring 44, so as to pass over any inequality in the surface of the ground without materially affecting the position of the plows. In turning at the corners, the furrow wheels are angled in the well known manner by the steering pole 16, the movement of which is transmitted to both of the axles 8 and 13.

When it is desired to lift the plows the operator presses forward on the foot lever 68, thus withdrawing the locking bolt 76 from engagement with the bracket 79 and at the same time swinging the pawl 61 into engagement with the ratchet wheel 60, so as to lock the land wheel against forward movement relative to the radius arm upon which said wheel is mounted. The wheel being thus locked, the draft of the team becomes effective to swing the wheel and radius arm bodily downward and backward, thus rocking the shaft 29 and swinging the shaft 58 upward so as to lift the plow beams and bodies, and at the same time the swing of the radius arm acts to raise the land side of the wheel frame so that the latter is horizontal when the furrow wheels move out of the furrows onto level ground. As the radius arm approaches a vertical position in its swinging movement the rearward extension of the foot lever 68 comes into engagement with the stop 69, as indicated in Figs. 6, 8 and 9, so that the further swinging movement results in the turning of the shaft 66, so as to withdraw the pawl 61 from engagement with the ratchet wheel. This disengagement of the pawl is timed to occur just as the toggle joint at 73 passes the line of centers, the plows being thus locked in their elevated positions.

It will be understood that the device for locking the plows down may be dispensed with either permanently, or temporarily, if desired, by simply moving the bracket 79 to an inoperative position, that is, a position such that it will not be engaged by the bolt 76. In case it should become necessary to elevate the plows when the machine is not in motion, the hand lever 38 is, of course, available for this purpose.

What I claim is:

1. In a mechanism of the class described, the combination of a wheel frame, ground wheels comprising front and rear furrow wheels and a land wheel upon which said frame is supported, a plow movably connected to the frame, a swinging radius arm carried by the wheel frame, the aforesaid land wheel being mounted on the free end of said arm, means for lifting the plow relative to the wheel frame comprising a crank and a slotted plate carried by the plow and engaged by said crank, means for adjustably connecting the radius arm to the lifting means, and means for swinging the radius arm to a certain limiting position to effect the lifting of the plow, the slot in said plate being shaped so that the plow is lifted by such swinging of the radius arm to the same height relative to the wheel frame irrespective of the adjustment of the connections between the radius arm and the lifting means.

2. In mechanism of the class described, the combination of a wheel frame, ground wheels comprising front and rear furrow wheels and a land wheel upon which said frame is supported, a plow movably connected to the frame, a swinging radius arm supported by the frame, the aforesaid land wheel being mounted on the free end of said arm, a rock shaft mounted on said frame, adjustable means adapted to connect the radius arm to the rock shaft in different angular positions, means for swinging the radius arm to a limiting upright position, and lifting devices interposed between the rock shaft and the plow, said devices acting when the radius arm is swung as stated to raise the plow to the same height relative to the frame irrespective of the adjustment of the connections between the radius arm and the rock shaft.

3. In a mechanism of the class described, the combination of a wheel frame, ground wheels comprising front and rear furrow wheels and a land wheel upon which said frame is supported, a plow movably connected to the frame, a rock shaft mounted on said frame, a radius arm mounted to swing about the axis of the rock shaft and carrying at its free end the aforesaid land wheel, adjustable means for securing the radius arm to the rock shaft in different angular positions in relation to said shaft, lifting connections between the rock shaft and plow comprising a crank carried by the rock shaft and a slotted plate carried by the plow and engaged by said crank, and means for swinging the radius arm to a certain limiting position to effect the lifting of the plow, the slot in said plate being shaped so that the plow is lifted by such swinging of the radius arm to the same height relative to the wheel frame irrespective of the adjustment of the securing means between the radius arm and the rock shaft.

4. The combination of a wheel frame, ground wheels upon which said frame is supported comprising a furrow wheel and a land wheel, a plow movably connected to the frame, means for lifting the plow mounted on the frame, a swinging radius arm supported by the frame, the aforesaid land wheel being mounted on the free end of said arm, means for adjustably connecting said arm to the plow lifting devices, means carried by the lifting devices and the frame for locking the plow down in operative position, and means carried by the swinging arm and the frame for automatically locking the plow in its raised or inoperative position when the arm is swung to a limiting upright position.

5. In a mechanism of the class described, the combination of a wheel frame, ground wheels comprising front and rear furrow wheels and a land wheel upon which said frame is supported, a plow movably connected to the frame, a swinging radius arm carried by the wheel frame, the aforesaid land wheel being mounted on the free end of said arm, means for lifting the plow relative to the wheel frame comprising a crank and a slotted cam plate carried by the plow and engaged by said crank, means for adjustably connecting the radius arm to the lifting means, and means for locking the land wheel to the radius arm to cause the swinging of the latter and the lifting of the plow, the slot in the said plate being shaped so that the plow is lifted to the same height relative to the wheel frame irrespective of the adjustment of the connection between the radius arm and the lifting means.

6. In a mechanism of the class described, the combination of a wheel frame, ground wheels comprising front and rear furrow wheels and a land wheel upon which said frame is supported, a plow movably connected to the frame, a swinging radius arm supported by the frame, the aforesaid land wheel being mounted on the free end of said arm, a rock shaft mounted on said frame, adjustable means adapted to connect the radius arm to the rock shaft in different angular positions, means for locking the land wheel to the radius arm to cause it to swing, and lifting devices interposed between the rock shaft and the plow adapted to raise the latter to the same height relative to the frame irrespective of the adjustment of the connection between the radius arm and the rock shaft.

7. In a mechanism of the class set forth, the combination of a wheel frame, ground arm to cause the swinging of the latter and wheels comprising front and rear furrow wheels and a land wheel upon which said frame is supported, a plow movably connected to the frame, a rock shaft mounted on said frame, a radius arm mounted to swing about the axis of the rock shaft and carrying at its free end the aforesaid land wheel, adjustment means for securing the radius arm to the rock shaft in different angular positions in relation to said shaft, lifting connections between the rock shaft and the plow comprising a crank and a slotted plate carried by the plow and engaged by said crank, the slot in the plate being shaped so that the plow is lifted to the same height irrespective of the adjustment of the securing means between the radius arm and the rock shaft, and means for locking the land wheel to the radius the lifting of the plow.

8. In a mechanism of the class described, the combination of a wheel frame, ground wheels supporting said frame, a plow, a swinging radius arm or crank upon which one of the ground wheels is mounted, adjustable connections between said arm and the plow adapted when the arm is swung to lift the plow, and means for automatically locking the plow in lifted position comprising a toggle linkage connected at one end to the swinging arm and at its other end to the wheel frame.

In testimony whereof I affix my signature, in presence of two witnesses.

CHARLES H. MELVIN.

Witnesses:
 Roy E. Anderson,
 Eugene I. Taylor.

It is hereby certified that in Letters Patent No. 1,112,150, granted September 29, 1914, upon the application of Charles H. Melvin, of Moline, Illinois, for an improvement in "Plows," errors appear in the printed specification requiring correction as follows: Page 6, strike out line 3; same page, line 22, after the word "radius" insert the words *arm to cause the swinging of the latter and;* and that the said Letters Patent should be read with these corrections therein that the same may conform to the record of the case in the Patent Office.

Signed and sealed this 10th day of November, A. D., 1914.

[SEAL.]

R. F. WHITEHEAD,
*Acting Commissioner of Patents.*